United States Patent
Tateson (10) Patent No.: US 8,462,691 B2
(45) Date of Patent: Jun. 11, 2013

(54) AD HOC COMMUNICATION SYSTEM (75) Inventor: Jane E Tateson, Suffolk (GB)

(73) Assignee: British Telecommunications plc, London (GB)

(*) Notice: Subject to any disclaimer, the term of this patent is extended or adjusted under 35 U.S.C. 154(b) by 759 days.

(21) Appl. No.: 12/594,013

(22) PCT Filed: Mar. 28, 2008

(86) PCT No.: PCT/GB2008/001058
§ 371 (c)(1),
(2), (4) Date: Sep. 30, 2009

(87) PCT Pub. No.: WO2008/119948
PCT Pub. Date: Oct. 9, 2008

(65) Prior Publication Data
US 2010/0128653 A1 May 27, 2010

(30) Foreign Application Priority Data

Mar. 30, 2007 (EP) .................................. 07251421

(51) Int. Cl.
*H04B 7/14* (2006.01)
*H04L 1/00* (2006.01)
*H04L 12/26* (2006.01)
*H04L 12/28* (2006.01)
*H04L 12/56* (2006.01)
*H04W 4/00* (2006.01)

(52) U.S. Cl.
USPC ........... 370/315; 370/231; 370/236; 370/238; 370/328; 370/392

(58) Field of Classification Search
USPC ................. 370/230–231, 235, 236, 238, 315, 370/328, 389, 392
See application file for complete search history.

(56) References Cited

U.S. PATENT DOCUMENTS 4,621,359 A * 11/1986 McMillen ..................... 370/235
5,115,433 A    5/1992 Baran et al.
(Continued)

FOREIGN PATENT DOCUMENTS

DE       10108555 A1    9/2002
WO       99/46899       9/1999
(Continued)

OTHER PUBLICATIONS

Baldessari et al., "Flexible Connectivity Management in Vehicular Communication Networks," Proceedings of the International Workshop on Intelligent Transportation, Mar. 15, 2006, pp. 211-216, XP002394813.

(Continued)

*Primary Examiner* — Ronald Abelson
(74) *Attorney, Agent, or Firm* — Nixon & Vanderhye PC (57) ABSTRACT

A number of data relay devices, e.g. mobile telephones, (10, 20, 30, 40, 50, 60, 70, 80), are conveyed by vehicles and move relative to each other. They form a vehicular ad hoc wireless network (19, 29, 39, 49), etc in which data stored by a device (20) (either own-generated or relayed from another device (10) is transmitted either directly or by means of one or more other devices (30) to a network access point (90) which interfaces with a cellular network. When two devices (20, 30) come into proximity to each other, they use an opportunistic routing algorithm to determine a forwarding direction for the data. A retransmit timer is triggered on transmission of data, and messages which are unacknowledged at the expiry of the timer period are retransmitted. The timer period dynamically follows local congestion conditions and is recalculated at each transmission by the expression, timer minimum period/recent forwarding success(t). The current recent forwarding success at time t, RFS(t), is calculated from the RFS(t−1) calculated for the immediately preceding transmission and from the current forwarding success, CFS, by the expression RFS(t)=4/5 RFS(t−1)+1/5 CFS(t) where CFS is the square of the ratio of the available buffer space in the target device to the size of the payload in the source device.

24 Claims, 5 Drawing Sheets

U.S. PATENT DOCUMENTS

| | | | |
|---|---|---|---|
| 5,987,001 A | 11/1999 | Ishioka et al. | |
| 6,038,215 A | 3/2000 | Uekumasu | |
| 6,118,834 A | 9/2000 | Räsänen | |
| 6,167,030 A | 12/2000 | Kilkki et al. | |
| 6,385,174 B1 | 5/2002 | Li | |
| 6,657,954 B1* | 12/2003 | Bird et al. | 370/229 |
| 6,687,227 B1 | 2/2004 | Li et al. | |
| 6,735,448 B1 | 5/2004 | Krishnamurthy et al. | |
| 6,904,275 B2 | 6/2005 | Stanforth | |
| 6,961,310 B2 | 11/2005 | Billhartz | |
| 6,990,070 B1 | 1/2006 | Aweya et al. | |
| 6,993,342 B2 | 1/2006 | Kuchibhotla et al. | |
| 7,020,501 B1 | 3/2006 | Elliott et al. | |
| 7,023,823 B2 | 4/2006 | Herrmann et al. | |
| 7,027,426 B2 | 4/2006 | Billhartz | |
| 7,609,644 B2 | 10/2009 | Tateson | |
| 8,027,810 B2 | 9/2011 | Tateson | |
| 2001/0055275 A1 | 12/2001 | Herrmann et al. | |
| 2002/0039357 A1 | 4/2002 | Lipasti et al. | |
| 2002/0186656 A1* | 12/2002 | Vu | 370/229 |
| 2003/0063585 A1 | 4/2003 | Younis et al. | |
| 2003/0072306 A1 | 4/2003 | Hunzinger | |
| 2003/0109285 A1 | 6/2003 | Reed et al. | |
| 2003/0202479 A1 | 10/2003 | Huang et al. | |
| 2003/0204587 A1 | 10/2003 | Billhartz | |
| 2003/0236866 A1 | 12/2003 | Light | |
| 2004/0022224 A1 | 2/2004 | Billhartz | |
| 2004/0029553 A1 | 2/2004 | Cain | |
| 2004/0233918 A1* | 11/2004 | Larsson et al. | 370/400 |
| 2004/0264422 A1* | 12/2004 | Calcev et al. | 370/338 |
| 2005/0047334 A1* | 3/2005 | Paul et al. | 370/229 |
| 2005/0094576 A1* | 5/2005 | Fonseca et al. | 370/255 |
| 2005/0207376 A1 | 9/2005 | Ashwood-Smith et al. | |
| 2006/0026295 A1* | 2/2006 | Iwamura | 709/233 |
| 2006/0126524 A1 | 6/2006 | Tateson | |
| 2006/0176863 A1 | 8/2006 | Robinson et al. | |
| 2006/0188020 A1* | 8/2006 | Wang | 375/240.16 |
| 2006/0206857 A1 | 9/2006 | Liu et al. | |
| 2007/0250623 A1* | 10/2007 | Hickey et al. | 709/224 |

FOREIGN PATENT DOCUMENTS

| | | |
|---|---|---|
| WO | 2005/006668 A1 | 1/2005 |
| WO | 2006/011123 | 2/2006 |
| WO | WO 2006/011123 | 2/2006 |

OTHER PUBLICATIONS

European Search Report dated Aug. 29, 2007 for EP 07 25 1421.
International Search Report for PCT/GB2008/001058 mailed Jun. 19, 2008.
Baldessari et al., "Flexible Connectivity Management in Vehicular Communication Networks", *Proceedings of the International Workshop on Intelligent Transportation*, Mar. 15, 2006, pp. 211-216, XP002394813.
EPO Examination Report dated Aug. 18, 2008, re EP 04 768 073.1.
EPO Examination Report dated May 25, 2007, re EP 04 768 073.1.
EPO Examination Report dated Jan. 11, 2007, re EP 04 731 660.9.
EPO Examination Report dated Aug. 21, 2006, re EP 04 731 660.9.
EPO Examination Report dated Jul. 20, 2006 re EP 04 768 073.1.
International Search Report dated Oct. 11, 2004, mailed Nov. 2, 2004 re PCT/GB2004/001999.
International Search Report dated Oct. 18, 2004, mailed Nov. 2, 2004, re PCT/GB2004/003510.
Communication of UK Search Report dated Dec. 9, 2003 re GB 0315758.3, and Search Report dated Dec. 8, 2003.
Gold, et al., "Use of Context-Awareness in Mobile Peer-to-Peer Networks," Proceedings, IEEE Workshop on Future Trends of Distributed Computing Systems, XX, XX, pp. 142-147, Oct. 31, 2001, XP0010886511.
Perkins, et al., "Highly Dynamic Destination-Sequenced Distance-Vector Routing (DSDV) for Mobile Computers," Proceedings of the SIGCOMM '94 Conference on Communication Architectures, Protocols and Applications, pp. 234-244, Aug. 1994.
Park, et al., "A Highly Adaptive Distributed Routing Algorithm for Mobile Wireless Networks," Proceedings of INFOCOM '97, pp. 1405-1413, Apr. 1997.
Stojmenovic, et al., "Power-Aware Localized Routing in Wireless Networks," IEEE Transactions on Parallel and Distributed Systems, IEEE Inc., NY, vol. 12, No. 11, pp. 1122-1133, Nov. 2001.
Stojmenovic, "Position-Based Routing in Ad Hoc Networks," IEEE Communications Magazine, IEEE Service Center, Piscataway, NJ, US, vol. 40, No. 7, Jul. 2002, pp. 128-134, XP001132650.
Johnson, "Routing in Ad Hoc Networks of Mobile Hosts," Proceedings of the IEEE Workshop on Mobile Computing Systems and Applications, pp. 158-163, Dec. 1994.
Perkins, "Ad Hoc on Demand Distance Vector (AODV) Routing," *Internet-Draft*, draft-ietf-manet-aodv-04.txt, Oct. 1999.
Toh, "Maximum Battery Life Routing to Support Ubiquitous Mobile Computing in Wireless Ad Hoc Networks," IEEE Communications Magazine, Jun. 2001.
Heinzelman, et al., "Energy Efficient Routing Protocols for Wireless Microsensor Networks," Proceedings of the $33^{rd}$ International Conference on System Sciences (HICSS '00), Jan. 2000.
Cerpa, et al., Habitat Monitoring: Application Driver for Wireless Communications Technology, ACM SIGCOMM Workshop on Data Communications in Latin America and the Caribbean, Costa Rica, Apr. 2001.
Xu, et al., "Adaptive Energy-Conserving Routing for Multihop Ad Hoc Networks," TECH. REP. 527, USC/Information Sciences Institute, Oct. 2000.
Culler, et al., "Network-Centric Approach to Embedded Software for Tiny Devices," DARPA Workshop on Embedded Software, Jan. 2001.
Doherty, "Algorithms for Position and Data Recovery in Wireless Sensor Networks," UC Berkeley EECS Masters Report, May 2000.
Pradhan, et al., "Distributed Source Coding Using Syndromes (DISCUS): Design and Construction," Proc. IEEE Data Compression Conference (DCC), 1999.
Pradhan, et al., "Distributed Source Coding: Symmetric Rates and Applications to Sensor Networks," Proc. IEEE Data Compression Conference (DCC), Mar. 2000.
Kusuma, et al., "Distributed Source Coding for Sensor Networks," Proc. IEEE Conf. on Image Processing (ICIP), Oct. 2001.
Ng, et al., "Approximate Inference Algorithms for Two-layer Bayesian Networks," Advances in Neural Information Processing Systems, Cambridge, MA, 2000.
Saul, et al., "Attractor Dynamics for Feedforward Neural Networks," Neural Computation, vol. 12, pp. 1313-1335, 2000.
Jaakkola, et al., "Bayesian Parameter Estimation Via Variational Methods," Statistics and Computing, vol. 10, pp. 25-37, 2000.
Jaakkola, et al., "Variational Probabilistic Inference and the QMR-DT Network," Journal of Artificial Intelligence Research, vol. 10, pp. 291-322, 1999.
Jordan et al., "An Introduction to Variational Methods for Graphical Models," Machine Learning, vol. 37, pp. 183-233, 1999.
Schurgers, et al., "Energy Efficient Routing in Wireless Sensor Networks," Networked & Embedded Systems Lab (NESL), Electrical Engineering Department, University of California at Los Angeles (UCLA), CA, 2000.
Wan, Presentation—"Energy Conservation in Ad Hoc and Sensor Networks—The Design Considerations," May 2, 2002.
He, "Speed: A Real-Time Routing Protocol for Sensor Networks," 'Online! Mar. 2002, pp. 1-12, XP002300153.
Singh, "Power-Aware Routing in Mobile Ad Hoc Networks", Proceedings of the $4^{th}$ Annual ACM-IEEE International Conference on Mobile Computing and Networking, 'Online!, Oct. 1998, pp. 181-190, XP002300154.
Tateson et al., "A Novel Mechanism for Routing in Highly Mobile Ad Hoc Sensor Networks," 'Online! 2004, pp. 204-217, XP002300155, 2002.
Becker, et al., "Transition-Independent Decentralized Markov Decision Processes," pp. 41-48, XP-002302634.
David, et al., "Bidders' Strategy for Multi-Attribute Sequential English Auction with a Deadline," XP-002302633, pp. 457-464, Bar-Ilan University, Department of Computer Science, Ramai-Gan 52900, Israel, 2002.
Office Action dated May 28, 2010, in U.S. Appl. No. 10/568,496.
Response dated Mar. 3, 2010, to Office Action in U.S. Appl. No. 10/568,496.

Office Action dated Dec. 8, 2009 in U.S. Appl. No. 10/568,496.
Response dated Jul. 28, 2009, to Office Action in U.S. Appl. No. 10/568,496.
Office Action dated Apr. 29, 2009 in U.S. Appl. No. 10/568,496.
Response dated Jan. 29, 2009, to Office Action in U.S. Appl. No. 10/568,496.
Office Action dated Oct. 29, 2008, in U.S. Appl. No. 10/568,496.
Response filed Nov. 8, 2011, in EPO Application No. 08 718 892.6-1249, in reply to the Communication under Rule 71(3) EPC dated Aug. 8, 2011.
Response filed Dec. 14, 2010, with Annex thereto, in EPO Application No. 08 718 892.6-1249, in reply to the Communication pursuant to Article 94(3) EPC dated May 27, 2010, and to the Notification of Loss of Rights dated Nov. 15, 2010.

IEEE Standard for Information Technology—Telecommunications and information exchange between systems—Local and metropolitan area networks—Specific requirements, Part 11, Wireless LAN Medium Access Control (MAC) and Physical Layer (PHY) specifications, IEEE Std 802.11-2007, pp. 131, 251, 256-257, 264, 266-268, 271, 280, 298, 300,303 (Jun. 12, 2007).

Lee, et al., IEEE Transactions on Wireless Communications, vol. 10, No. 11, "Simple, Practical, and Effective Opportunistic Routing for Short-Haul Multi-Hop Wireless Networks," pp. 3583-3588 (Nov. 2011).

* cited by examiner

AD HOC COMMUNICATION SYSTEM

RELATED APPLICATIONS

This application is related to commonly assigned, co-pending application Ser. No. 10/560,617 (now U.S. Pat. No. 7,609,644) and Ser. No. 10/568,496.

This application is the U.S. national phase of International Application No. PCT/GB2008/001058 filed 28 Mar. 2008 which designated the U.S. and claims priority to European Patent Application No. 07251421.9 filed 30 Mar. 2007, the entire contents of each of which are hereby incorporated by reference.

The present invention relates to methods of operating opportunistic ad hoc networks, particularly, but not exclusively, vehicular ad hoc networks, and to wireless data relay devices for use in such networks.

In packet switching technology in general, it is known to start a retransmission timer upon transmission of packets, and to retransmit any packets for which an acknowledgement has not been received before the expiry of the timer period. It is also known to back off the retransmission timer at each repeat transmission of a packet which remains unacknowledged, usually doubling the period at each repeat transmission, for example as disclosed in Internet Engineering Task Force Request for Comments 2988, which defines the standard algorithm that Transmission Control Protocol (TCP) senders are required to use to compute and manage their retransmission timer. The objective of backing off the retransmission timer is to reduce the risk of overloading the network with multiple copies of a retransmitted packet.

The known TCP backoff algorithm takes no account of network operating conditions, but is based on the simple fact that, for whatever reason, the source device has not received an acknowledgement for its transmitted packet.

The present invention seeks to provide for retransmission of unacknowledged packets based on local conditions.

In accordance with a first aspect of the present invention, there is provided a method of operating an opportunistic relaying network comprising at least one network access point, and a plurality of mobile wireless data relay devices each having a buffer for storing data messages, whether own-generated or received, such stored data messages being referred to hereafter as payload data, the method comprising the steps of: at a source one of said devices having payload data to be relayed to a network access point, the network access point being out of range of the source device, (a) transmitting a request to transmit, RTS, in respect of payload data;

(b) receiving, from each said device within range of the source device and responding to the transmitted RTS, respective status data comprising an indication of its buffer vacancy;

(c) selecting in accordance with an opportunistic routing algorithm, a responding device to receive payload data;

(d) setting the period of a retransmit timer to be a minimum value multiplied by an inverse function of the buffer vacancy of the selected device;

(e) transmitting payload data to the selected device;

(f) triggering, upon that transmission, the retransmit timer; and (g) upon expiry of the retransmit timer period, repeating steps (a) to (f) in respect of any transmitted payload data for which acknowledgement generated by a network access point has not been received.

Preferably, the inverse function includes the ratio of the buffer occupancy of the source device to the buffer vacancy of the selected device, and more preferably includes the square of that ratio.

The inverse function is preferably the summation of two terms, the first term being a fraction k of the square of that ratio, and the second term being a fraction j of the value of the inverse function for the immediately preceding transmission from that source device. The fraction j may be equal to 1−k, and preferably the fraction k is one fifth.

The source device may transmit the payload data together with associated identifiers, and the or each network access point may be arranged such that the generated acknowledgement includes the identifiers of received payload data.

The devices may send received acknowledgements when responding to a received RTS. Alternatively, the devices may send received acknowledgements in response to receipt of payload data.

In accordance with a second aspect of the present invention, there is provided a data relay device having:

a buffer for storing payload data for subsequent transmission; a transmitter;

a receiver; requesting means for sending to the transmitter a request to transmit, RTS, in respect of payload data;

a retransmit timer having a minimum timer period;

processing means, responsive to status data received from other devices responding to a transmitted RTS, to select, in accordance with an opportunistic routing algorithm, a responding device, to send to the transmitter payload data for the selected device and to trigger the retransmit timer, and responsive to receipt of an RTS from another device to generate status data including an indication of its buffer vacancy and to send that generated status data to the transmitter;

setting means responsive to an indication of buffer vacancy included in received status data to set the period of the retransmit timer to be the minimum period multiplied by an inverse function of the buffer vacancy of the selected device; and means responsive to the absence, at the expiry of the retransmit timer period, of acknowledgement in respect of transmitted payload data to cause the requesting means to send a further request to the transmitter, and to cause the processing means to repeat in respect of unacknowledged transmitted payload data, its functions of selecting, sending and triggering.

Preferably, the inverse function includes the ratio of the buffer occupancy of the source device to the buffer vacancy of the selected device, and more preferably the inverse function includes the square of that ratio.

The inverse function may include a fraction k of the square of that ratio added to a fraction j of the inverse function for the immediately preceding transmission from that source device. The fraction j may be equal to 1−k, and preferably the fraction k is one fifth.

The processing means may be arranged to transmit the payload data together with associated identifiers.

The processing means may be arranged to send received acknowledgements when responding to a received RTS. Alternatively, the processing means may be arranged to send received acknowledgements in response to receipt of payload data.

It is known from the article "Flexible Connectivity Management on Vehicular Communication Networks" by Roberto Baldessari et al, published in Proceedings of the 3rd International Workshop on Intelligent Transportation, March 2006, pages 211-216, to provide fixed Roadside Units (RSUs)

and to use an algorithm for selecting a path from a source vehicle to a destination vehicle. In the general case, there will be a first path from the source vehicle to the destination vehicle which is solely wireless via one or more intermediate vehicles, and second path comprising the two wireless legs between the source and destination vehicles and their respective nearest RSUs, and the landline leg between these two RSUs. The algorithm uses distance and hop count to select the more optimal path, and a source vehicle periodically floods discovery queries to check whether the selected path is still optimal. The RSUs also have connections to gateways to the Internet for communication with correspondent nodes connected to the Internet.

It is also known from U.S. Pat. No. 6,687,227 (Li et al) for an intermediate node between a first TCP end host and a second TCP end host to receive from the second TCP end host a client advertised window size (CWS), and to generate from it and from the length of the queue in the intermediate node waiting to be transmitted over a high speed wireless channel to the second TCP end host, a revised advertised window size (AWS) such that the smaller the length of the queue, the larger the value of the AWS. The intention is to maintain the queue with available packets most of the time so that the wireless channel will be more fully utilised.

Figure 1:
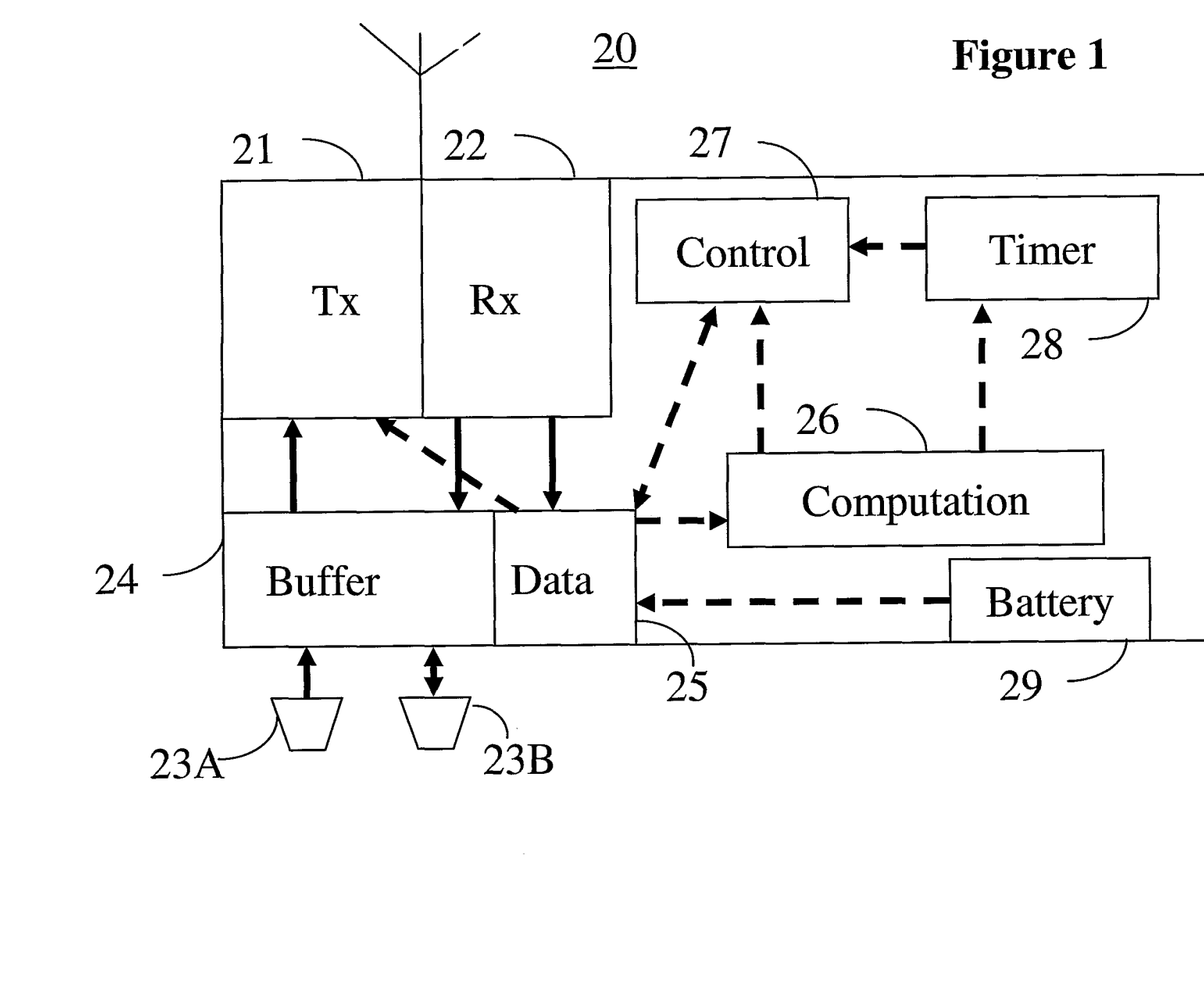
FIG. 1 is a schematic diagram of a device according to the invention.

Embodiments of the invention will now be described, by way of example only, with reference to the Figures in which:

FIG. 1 shows functional components of a mobile telephone device 20 according to the invention. The device 20 may be conveniently embodied by commercially available devices such as a Hewlett Packard iPAQ hw6515 Mobile Messenger, modified to operate as described later.

In operation of a method according to the invention, the device 20 would be associated with a vehicle, e.g. a car, so as to travel with the vehicle. Thus, in some cases, the device 20 would be in the possession of its user as an occupant (driver or passenger) of the vehicle and switched on. The device 20 might be in, say, the user's pocket or in, e.g. a briefcase or bag. In other cases, the device 20 can be demountably attached to the vehicle by known means, e.g. a bracket clipped to a facia air vent, or a suction mounted bracket attached to the inside of the windscreen. The device 20 might have its power socket connected by a suitable cable to the cigar lighter socket of the car. In yet another case, the device 20 can be permanently built into the vehicle in the manner of known car phones.

The device 20 comprises a wireless transmitter 21 and a wireless receiver 22, a user interface 23A for operating the device 20, including microphone, loudspeaker, keypad and display, and a Global Positioning System (GPS) sensor 23B. The user interface 23A and the GPS sensor 23B together constitute a data collection means 23 of the present invention.

The device 20 also comprises a data buffer 24 (also known as a buffer store) for storing a maximum of thirty messages of payload data that is to be transmitted to a wireless access point (WAP) 90, also known as a network access point, (see FIG. 2) for onward transmission to a cellular network comprising an array of fixed base stations. The cellular network is not shown, as the cellular network itself is not part of the present invention. The device 20 further comprises a data store 25 for operational data (that is to say, data required for the operation of the device and in particular for controlling the transmission of the payload data). There is also computation means 26 for processing the data provided by the data collection means 23 and stored in the data buffer 24, and control means 27 for controlling the operation of the device in response to outputs from the computation means 26. There is also a retransmit timer 28, which is triggered when the device 20 transmits payload data to a neighbouring device.

Figure 2:
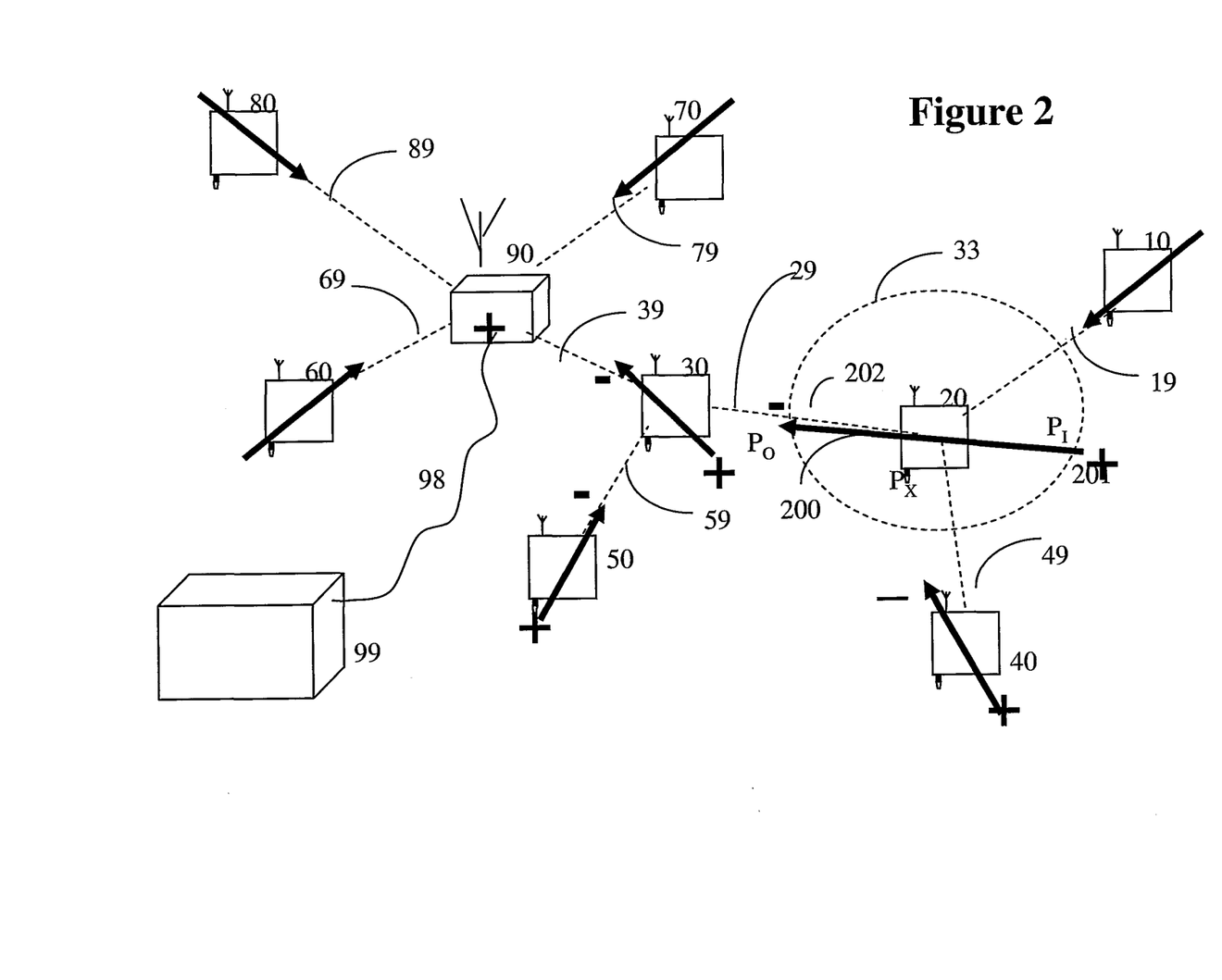
FIG. 2 is a diagram of part of an ad hoc network made up of devices of the kind shown in FIG. 1.

In practice, there will be more than one WAP 90, for example it is expected that in an area 1.5 km square there will be about twenty WAPs 90.

In the context of the preferred embodiments of the present invention, wireless communication between the devices 20, 30 and between such a device and a WAP 90 is to be taken as radio communication in accordance with the IEEE 802.11 protocol as known in the art.

If an acknowledgement (ACK) is not received by the device 20 in respect of a transmitted message before the expiry of the retransmit timer 28, the control means 27 causes the retransmission of the unacknowledged message.

In this embodiment, the device 20 deletes acknowledged messages from its buffer upon receipt of the acknowledgements. In an alternative embodiment, the device 20 marks each acknowledged message for dropping, and at the expiry of the retransmit timer 28 the device 20 will start a transmit process, described later, and, if it is successful in selecting a target device, parse the buffer contents, and, ignoring marked packets, send to the transmitter 21 the required number of unmarked packets (as determined by the buffer occupancy of the selected device), and then tidy the buffer by deleting all marked packets.

The timer period of the retransmit timer 28, also referred to as the retransmit period, is a function of the buffer occupancy of the data buffer 24 of the device 20 and also of the occupancy of the data buffer 24 of a receiving device 30, 40 etc. In general terms, the period of the retransmit timer 28 is increased from its minimum period ($t_{min}$) of ten seconds, in dependence upon the ability of the data buffer of a receiving device to accept the payload of the data buffer of a transmitting device. This function will be described in detail later.

The device 20 is powered by a battery 29 whose condition is monitored and the results stored in the data store 25 with other operating parameters. (The power connections themselves are not depicted in this schematic diagram).

FIG. 2 shows a wireless vehicular ad hoc network (VANET) comprising individual functionally identical mobile telephone devices 10, 20, 30, 40, 50, 60, 70 and 80, each being associated with a respective vehicle. Contemporaneous wireless links are shown for transmissions from one device to another. In FIG. 2, these are link 19 from device 10 to device 20, link 29 from device 20 to device 30, link 39 from device 30 to the WAP 90, link 49 from device 40 to device 20, link 59 from device 50 to device 30, link 69 from device 60 to the WAP 90, link 79 from device 70 to the WAP 90, and link 89 from device 80 to the WAP 90. The WAP 90 provides access to a cellular network comprising an array of fixed base stations (not shown, as the cellular network itself is not part of the present invention). In practice, there will be more than one WAP 90, for example it is expected that in an area 1.5 km square there will be about twenty WAPs 90.

As the devices 10, 20 etc move with their associated vehicles, the wireless links 19, 29, 39 etc between them have to be re-arranged in order to provide the optimum network. As well as physical location, factors such as the spare capacity of the buffer 24 are taken into account in determining whether a wireless link 29 should be established between two devices 20, 30. The process by which this is done will be described in detail later.

When a device 20 (source) has identified a device 30 (target) to which data can be forwarded, it retrieves data from its buffer 24 and transmits it to the target device 30. The device 30 then repeats the process of identifying a suitable neighbour and so on, until the data reaches the WAP 90. If no suitable device is identified, the data is stored in the buffer 24 until the movements of the devices bring a suitable device into range. As used herein, the terms forwarding and relaying are to be taken as synonymous in the sense that the device 30 onward transmits received payload data.

In general, it is desirable that the devices transmit data in the general direction of the nearest WAP 90. Thus, when two devices 20, 30 come into proximity of each other, a direction 200 needs to be determined to identify which of the devices 20, 30 should transmit data and which of the devices 20, 30 should receive it. In brief, a device 20 with payload data to send to a WAP 90 sends a Request To Send signal, RTS, and any device 30, 40 receiving that RTS responds by sending certain status data to enable the device 20 to calculate for itself a direction 200, referred to as the "forwarding direction" for the device 20, having a receive end 201 and a transmit end 202 for the device 20. The device also determines, in accordance with its opportunistic routing algorithm, whether to forward data to the nearest neighbour 30 whose location is in this direction, based on the separation of the devices 20, 30, and other characteristics, as will be described in detail later.

If a WAP 90 is within direct transmitting range (as for example is illustrated for device 30), the forwarding direction will be towards the WAP 90. Any device 20 which is not in range of a WAP 90 is arranged to align its forwarding direction 200 towards the receive end of one or more neighbouring devices 30. Thus a network 19, 29, 39 etc will be defined, each device having its transmit end 202 aimed in the direction of the receive end 201 of the next device until they reach a WAP 90.

In this embodiment, each WAP 90 has a unique MAC address which any device 20 coming within range will detect and use to access a lookup table (not shown specifically) of geographic positions of the WAPs 90. In alternative embodiments, the devices do not employ such a lookup table, but, instead, each WAP 90 includes geographic position data in a suitable or additional field of the IEEE 820.11 packets that it sends to in-range devices.

Upon receipt of a transmission of payload data, a WAP 90 responds with a specific acknowledgement for that received transmission.

Each device maintains a respective acknowledgement list, acklist, of received acknowledgements, and also a respective sent list, sentlist, of identifiers of its originated messages which have been sent, when they were sent and whether an acknowledgement for a sent message has been received. (This need not be recorded at the packet level, but per flow.) In addition, the devices exchange and cache their acklists, as explained in more detail later.

Figure 5:
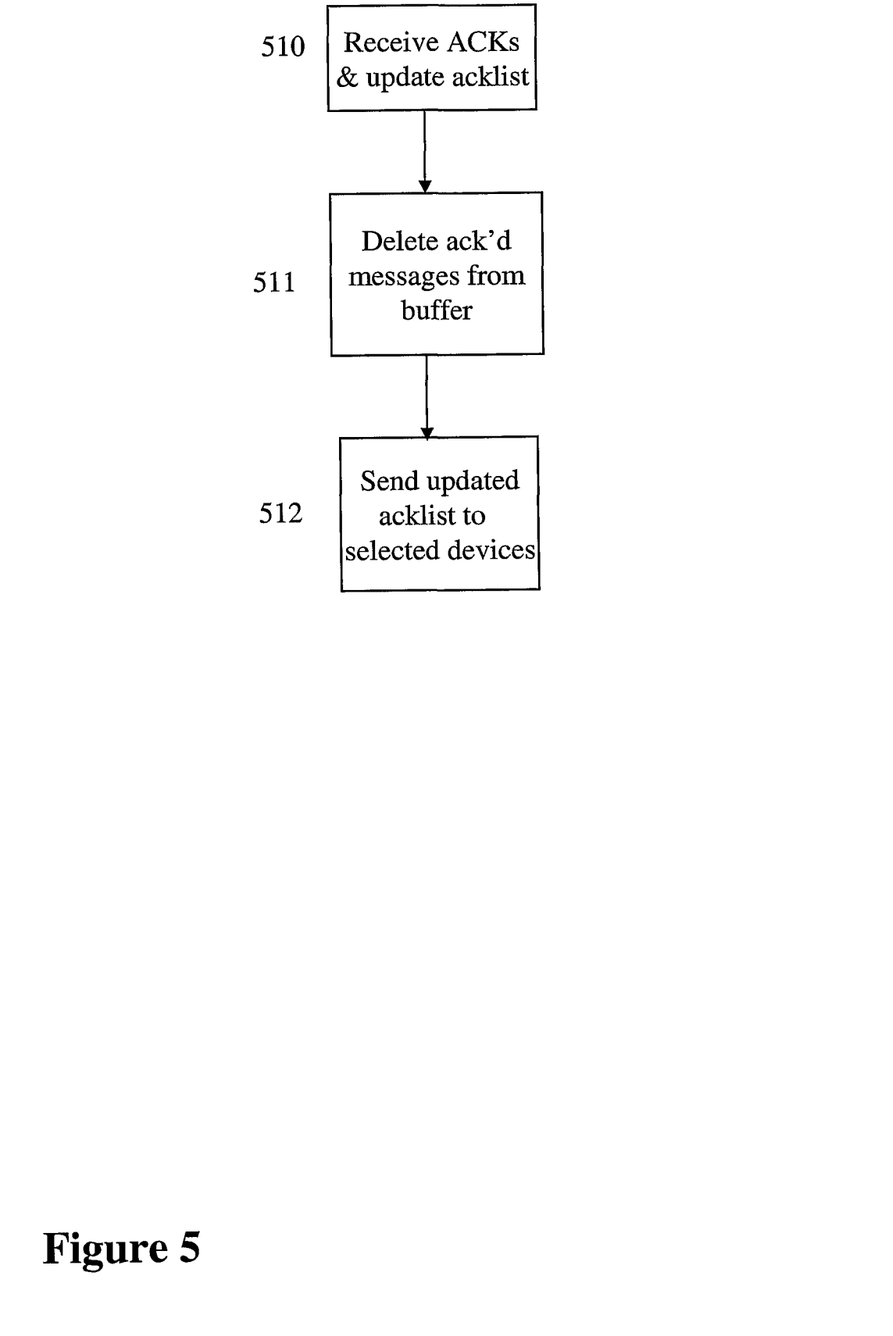
FIG. 5 is a further flow chart showing the response of the device to receipt of acknowledgements.

Thus, when the device 30 transmits messages to the WAP 90 (comprising any own-generated messages and messages that it has received from other devices for forwarding to the WAP 90), for each packet flow/message acknowledgement, ACK, that it receives from the WAP 90, it generates an entry in its acklist (step 510, FIG. 5). The acklist comprises pairs of indices: in a pair, one index refers to the device which originated the packet flow/message, and the other index refers to a unique or recycled pseudo-unique identifier for that packet flow/message. As the lifetime over which knowledge of these packet flow identifiers is only a few seconds, a device need not use a consistent identifier to identify itself and hence its packet flow. It could choose a random number to identify itself, or use encryption to conceal its identity.

The device 30 now has an updated acklist which it needs to send to other devices. In this embodiment, the device 30 sends an RTS and, in accordance with the routing algorithm, all devices within range respond with their status data including their device indexes, thus enabling the device 30 to select (in a manner similar to the steps taken by device 20 for selecting the device 30 as the target device for receiving payload data) those of the responding devices which have their forwarding directions pointing towards the device 30, rather than away from it, and to send the updated acklist to those selected devices (step 512, FIG. 5). In an alternative embodiment, the device 30 sends the updated acklist to all the responding devices. In another alternative embodiment, the device 20, 30 is not proactive upon an update of its acklist, but waits until it receives an RTS and then sends a response comprising its status data and its acklist.

If the device 20 has remained in range of the device 30 and receives the transmitted acklist from the device 30, it now updates its acklist on the assumption that information from the device 30 is more up to date, or more relevant.

In this embodiment, a source device assigns an identifier to each message, and relaying devices are free to split a received group of messages when forwarding to other devices. In other embodiments, messages are sent in groups of a minimum size, which must not be split further. In this case, the source device assigns identifiers to each such group of messages. If a target device has insufficient space in its buffer to accept a compete group, then the source device must wait until it can find a target device that can accept the complete group.

Figure 3:
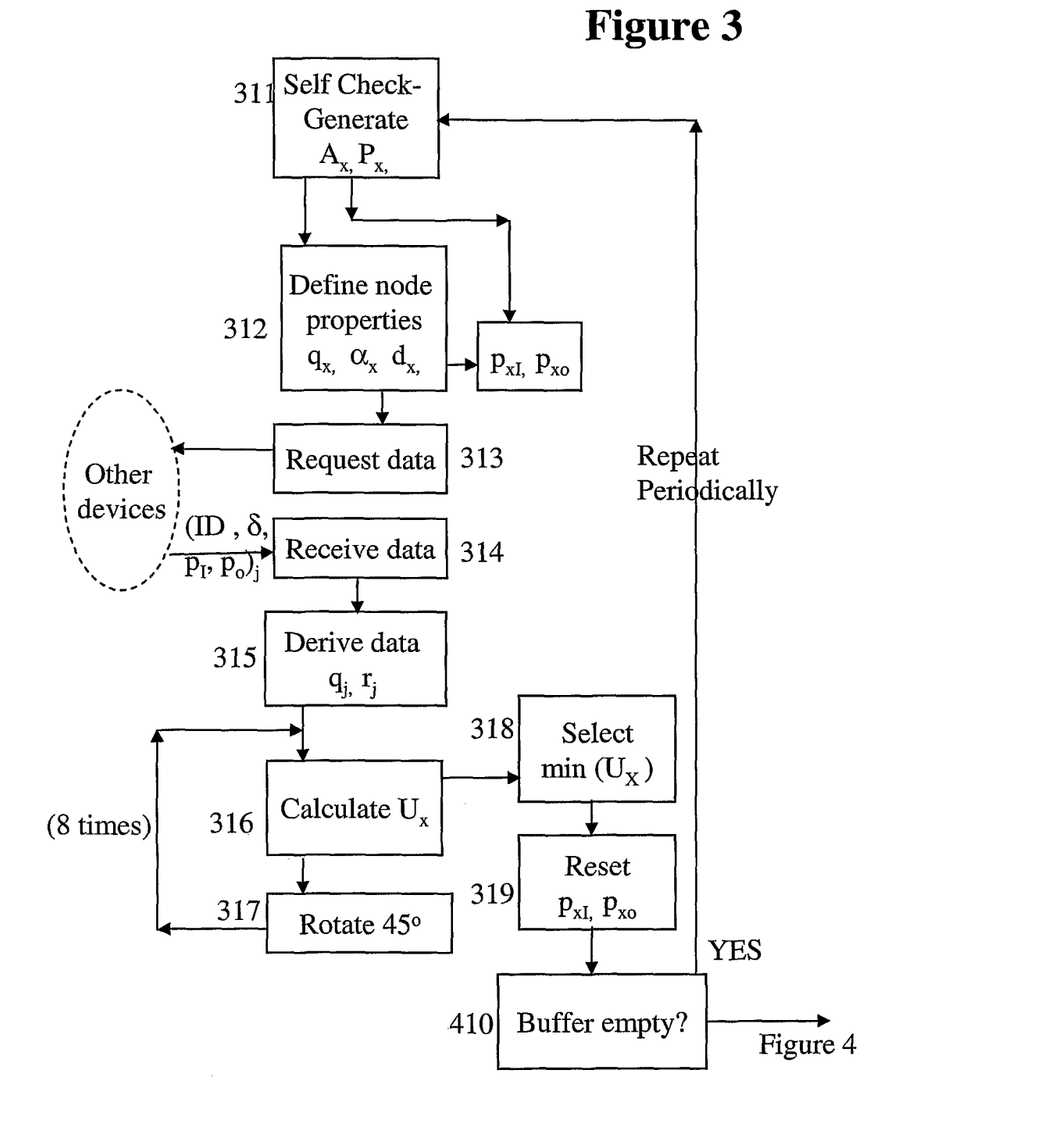
FIG. 3 is a flow chart showing the processes performed by an individual device, and the information it exchanges with similar devices, in order to determine the current values for the parameters used in the forwarding process.
Figure 4:
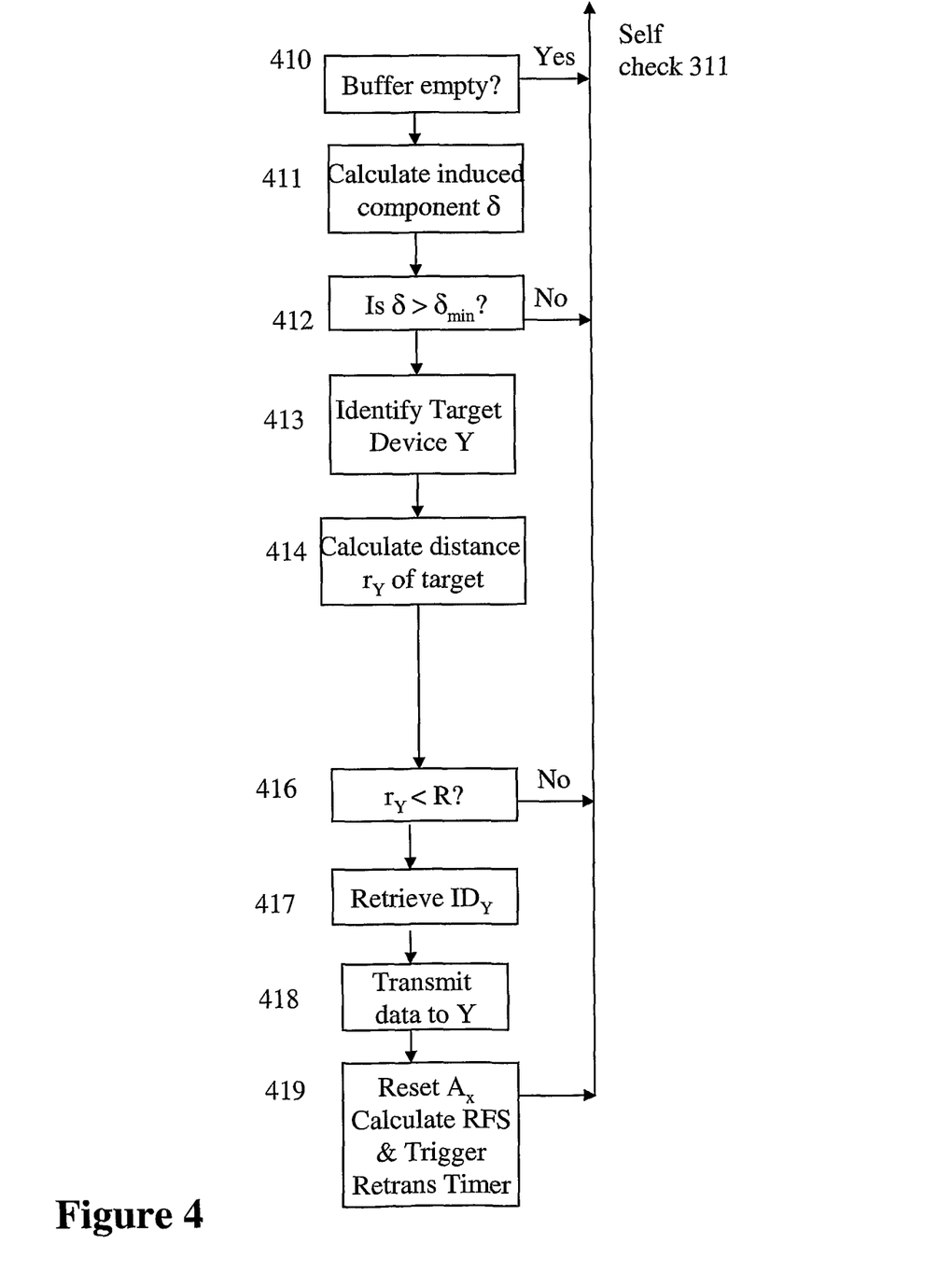
FIG. 4 is a further flow chart, showing the processes used to identify a target device and to transmit data to it, using the parameters generated in the process of FIG. 3.

A more detailed description of the operation of this embodiment will now be given with reference to FIGS. 3 and 4.

Each device (20 etc) initially measures and stores a number of attributes relating to itself (step 311). These attributes are:

Buffer occupancy, $A_X$—a scalar quantity representing the amount of data awaiting transmission, expressed as a fraction of the total capacity of the buffer 24.

Position, $P_X$—a pair of co-ordinates (or a triplet if three dimensions are needed). Instead of each device having its own GPS sensor, then provided that at least one of the devices can determine its absolute position, the absolute positions of all the others can be derived, as discussed in International Patent Specification WO03/107595 which provides a method of estimating the location of a device within a network of devices each of which forms a node of the network, the method including the steps of:

obtaining information specifying the location or estimated location of one or more neighbouring nodes;

measuring the distance to said one or more neighbouring nodes; and iteratively modifying an estimated location of the device, such as to improve the consistency between the estimated location of the device and the location or estimated location of the one or more neighbouring nodes, as determined from the obtained information specifying the location or estimated location of the one or more neighbouring nodes, on the one hand and the measured distances to each of the one or more neighbouring nodes on the other hand.

Using the values $A_X$ and $P_X$, the positions and other attributes are defined (step 312) for two virtual nodes 201, 202, referred to herein as the positive node and the negative node—these being the aforementioned receive end 201 and transmit end 202. The nodes are constrained to be located at diametrically opposed points $P_+$, $P_-$ on a circle 33 (or a sphere in a three dimensional embodiment) centred on the device 20. The diameter $d_X$ of the circle is a function of the buffer occupancy $A_X$. Thus the actual position $P_X$ of the device 20 is the mid-point of a line of length d joining the points $P_+$, $P_-$ of the two nodes. The orientation of this line is initially arbitrary (it may be defined with reference to the device itself or a compass bearing, or a previous position), but it subsequently takes up a position 200 determined by the properties of neighbouring devices 10, 30, 40 etc.

The nodes 201, 202 represent an input direction and an output direction for the device 20. These are the directions respectively in which data is to be forwarded, respectively, to and from the device 20. However, it should be clearly understood that the nodes 201, 202 are purely points in space, defined with respect to the relative positions of the device 20 and its neighbours. Unless directional antennas are to be used, it does not relate to the actual orientation of the device itself, which may be changing rapidly. For the purpose of describing transmission from a source device, the WAP 90 is represented as a single positive node.

Each node is attributed an influence value Q. This influence value is a measure of the ability of that node to influence the nodes of other devices 10, 30, 40 etc. The positive node of each device has an influence value $Q_+$ whose value is a positive number. The output end has a negative influence value, $Q_-=-Q_+$, equal in magnitude to the influence value of the positive node. The scalar magnitude of the influence values of the node pair has two components: an intrinsic component q which is simply a function of the buffer occupancy $A_X$, and is independent of other devices, and an induced component $\delta$, which is influenced by neighbouring devices. As will be discussed later, the value of the induced component $\delta$ depends on the positions and influence values of the neighbouring devices, and their ability to be influenced by other devices $\alpha_x$, which is again a function of the buffer occupancy $A_X$.

The properties d, q, and $\alpha$ are selected such that the strongest interactions occur between a device with a full buffer (A=1) and another device with an empty buffer (A=0). The influence value $Q_S$ for a WAP 90 is set at the maximum value. In this embodiment $Q_S$=1, and all other devices have fractional values for Q. Each device 20, 30 stores the values $Q_S$=1 and A=0 for a WAP 90, and uses these to calculate its forwarding direction to a WAP 90. In other words, unlike the devices 20, 30, the WAP 90 does, not send status data.

These properties could be allowed to vary continuously according to the quantity of data in the device's buffer, but to reduce the memory and calculation required this embodiment quantifies buffer occupancy as one of a small number of levels, for example empty, full, and three intermediate levels—each level having a specified value for each property $d_X$, $q_X$, $\alpha_X$ This requires the devices 20 etc to store just 15 values (i.e. 5 levels×3 properties), thus minimising the memory required of the devices. Any device can then determine the values of $d_X$, $q_X$, $\alpha_X$ for itself, or for any neighbouring device, from the buffer occupancy category $A_X$ alone.

In order to calculate the forwarding direction for a device X, only the permanent components $q_+$, $q_-$ of the influence values are used. Initially, the induced component $\delta_X$ is set at zero.

When a device X has data stored in its buffer, it broadcasts a Request To Send signal, RTS, (step 313) to identify whether any other devices are in the vicinity. Any device 10, 30, 40 detecting this broadcast responds (step 314) with the positions $P_{Y+}$, $P_{Y-}$ of its own node pair, and the induced influence component $\delta_Y$, and its device index (also referred to as a device ID). This is sufficient information to determine the other properties of the node pair—from the positions of the pair of nodes their separation $d_Y$ can be determined, from which can be deduced the value of the buffer occupancy $A_Y$ and hence the permanent influence values $q_{y+}$, $q_{y-}$ of the two nodes (step 315).

Using the position and influence attributes received from its neighbours, a device X can then determine a scalar interaction value $$U_X = \sum_i^{i \in X} \sum_j^{j \neq i} \frac{q_i q_j}{r_{ij}},$$

(step 316) for both nodes i of the device performing the calculation and all nodes j of any neighbouring devices 10, 30, 40 etc, and where $r_{ij}$ is the distance between node i and node j. Note that the value of $q_i$ is the same for each term in this summation, except that it is negative when considering the negative node, so this formula can be simplified to $$U_X = q_{X+} \left( \sum_j^{j \notin X} \frac{q_j}{r_{j+}} - \sum_j^{j \notin X} \frac{q_j}{r_{j-}} \right)$$

where $q_{X+}$ is the influence value of the positive node of device X, and $r_{j+}$ is the distance between the positive node of device X and node j of another device, and $r_{j-}$ is the distance between the negative node of device X and node j of another device. As the nodes are merely virtual points in space, it is possible that nodes of neighbouring devices may be defined to be at the same point.

Thus, for each of the two nodes i of the device X under consideration, the aggregate value of the influence attributes of each node j of its neighbours may be calculated, weighted for distance r. (Since r=0 would lead to an infinite value for $U_X$, the value of "r" is defined such that it cannot be less than a predetermined minimum value). Note that each neighbouring device will have two nodes to be considered, whose activity attributes $q_+$, $q_-$ are equal and opposite, but whose distances r from any other given node j will generally be different, as, one node will be nearer than the other. Thus the number of interactions to be determined is 4n where n is the number of neighbour devices—each neighbour has two nodes, and the interaction of each neighbour node is considered with each of the device's own two nodes.

The orientation 200 of the nodes 201, 202 in the device is initially arbitrary: but having established a value for $U_X$ the positions of the nodes are now redefined to be rotated about the centre $P_X$ (the actual location of the device X) (step 317) and a new value of $U_X$ is calculated (repeat step 316). In the present embodiment, eight orientations are assessed in this way, spaced at 45 degrees. Note however that the positions of the nodes $P_{X+}$, $P_{X-}$ are symmetrical about the centre $P_X$, and they differ only in the sign of their influence values Q. Consequently only four calculations need to be performed—the other four have the same magnitudes, but opposite signs.

An optimum orientation 200 is then determined (step 318)—this is the orientation giving the minimum value of $U_X$. This orientation 200 is then maintained for subsequent steps of the process, and the positions $P_+$, $P_-$ of the nodes 201, 202 are stored (step 319) for transmission to other devices 10, 30, 40 when they request them, to use in their own computations. If each device maintained constant values for positions P and buffer occupancies A, (and hence influence value Q) their node orientations would eventually reach a steady state. However, in practice, the devices are moving and transferring data, so these values are constantly changing.

Any device 30 that detects a WAP 90 in its vicinity would therefore generate an orientation for its node pair whose direction is towards the WAP 90. Such a device 30, in turn, has a knock-on effect on other nearby devices 20, 50 that are too far away from the WAP 90 to forward to it directly, and these nearby devices 20, 50 will also influence devices 10, 40 yet further away from the WAP 90, to orient their forwarding directions so as to make a path to the WAP 90, via the intermediate devices 20, 30 (for example path 19, 29, 39). The result is that, irrespective of network topology, all devices (unless entirely cut off by distance from regions of the network that have paths to a WAP 90) will have a forwarding direction 200 that is likely to enable transmission of data to a WAP 90.

The aggregate alignment influence of neighbouring devices is therefore determined quantitatively, according to the separation of the devices r, and their current preferred forwarding directions. In general, a device is likely to be within the influence of several other devices, some of which will have conflicting (opposite) influences, and their effects need to be combined to provide a single forwarding node pair. Usually, a device will be most strongly influenced by its closest neighbour, but it will also be influenced to a lesser extent by the other neighbours. As will be explained below, other factors intrinsic to the devices, in particular the available buffer storage may not be equal for all devices, and these will affect the scalar magnitude (but not the direction) of the influence value q, reducing or increasing the influence it has on neighbouring devices.

The alignment, and thus the positions of the nodes $P_+$, $P_-$ is recalculated whenever the device 20 generates, receives or transmits payload data as this affects the buffer occupancy $A_X$. The alignment may also be recalculated periodically as the device 20 and its neighbours move if resources are available.

When a device starts a calculation of its alignment, the initial value it uses for the position of the negative node is as close as possible to that calculated at the previous iteration, subject to the constraint that it must be at a distance d/2 from the position P of the device itself. If the device has not moved, the positive node will therefore also be in the same position as at the previous iteration. However, if the device has moved the initial position of the positive node will have moved. Thus the orientation of the device will rotate such that it still points towards the same point in space (the negative node). An alternative approach would be to keep the orientation the same, i.e. parallel with its previous orientation.

When the device has data to transmit, i.e. its buffer 24 is not empty, (step 410) the device performs further computations to determine the strength of interaction (alignment influence) between neighbouring nodes, as will now be discussed with reference to FIG. 4. A strong interaction indicates that forwarding is likely to be useful: both in terms of proximity of a device with buffer capacity to accept the payload data, and also with a good probability of a long-range forwarding chain to the WAP 90. This is done by calculating an induced component δ of the influence value Q, which is itself influenced by the influence values $q_j$ of neighbouring devices, and is given by $$\delta_X = \frac{\alpha_X}{d_X} \sum_{j}^{j \neq A} \frac{q_X(q_j + \delta_j)}{r_{Xj}^2},$$

(step 411) where $\delta_j$ is the induced component of Q for a node j of a neighbouring device, $\alpha_X$ is the measure referred to above of the degree to which the device X can be influenced, $d_X$ is the spacing between the nodes of device X, and $q_X$ is the permanent influence value of device X, all of which values are derived from the buffer occupancy $A_X$. $q_j$ is the influence value of a neighbouring device at distance $r_{xj}$. If this induced value exceeds a pre-set threshold, then data is forwarded to the nearest device to the negative node of the device, provided that this neighbouring device is within transmission range.

The induced value, $\delta_X$, is compared with a fixed threshold $\delta_{min}$, (step 412). The nearest device 30 (the target device) to the negative node P. (202) is identified from the position data of the neighbours (step 413). The distance r of this target device is determined (step 414) and compared (step 416) with a broadcast range R. A check is made (step 417) to ensure the payload data did not originate from the target device, i.e. that a device index received from the target device (in the response step 314) is not identical to the device index of any of the messages of the payload that it is waiting to transmit. Lastly, the choice of influencing neighbouring devices is restricted to exclude from consideration any subject device from which data has recently been received. This is to stop data "ping-ponging" backwards and forwards. Larger loops may occur briefly from time to time, but they would be unlikely to persist for long as the relative positions of the devices change, and in the absence of a WAP node in the vicinity.

A common broadcast range R is assigned to each device 20, 30 and this is determined on the assumption that each device 20, 30 will have its battery fully charged.

If the neighbour device 30 is within broadcast range (r<R) and the other conditions referred to above are met the payload data is read from the buffer 24, addressed to the neighbour device 30 using its device index (step 418) and transmitted to the neighbour device 30. This device index could be permanent, e.g. an International Mobile Equipment Identity, or it could be non-permanent, say a random or pseudo-random number generated once a day, or at the start of a journey.

If a device 20 is cut off from any path to a WAP 90 it can simply keep any payload data in its buffer 24 until the movements of the devices re-establishes a feasible route. Forwarding directions 200 are updated dynamically, so that as soon as a link 29 is re-established, transmission of data can re-start. If the network is sparsely populated, such that nodes are widely separated, most data transmissions may only occur when a device 20 comes within direct range of a WAP 90. In densely populated networks, paths having a larger number of hops 19, 29, 39 will be more common. The process is flexible enough to cope with a wide range of circumstances, in terms of network topology and device mobility, without such variations requiring special treatment.

Following the transmission of the payload data (step 418), in step 419, the device 20 calculates the value for the current timer period of the retransmit timer 28 and triggers the retransmit timer 28. The device 20 also checks whether it has received any new messages for onward relaying, stores these in the buffer, and then updates the value of its buffer occupancy in accordance with any newly stored messages. The process now returns to step 311, which uses the updated value of buffer occupancy.

The device 20 calculates the value of the current timer period in accordance with the equation current timer period=minimum timer period/recent forwarding success The manner in which the computation means 26 calculates the value for recent forwarding success (RFS) will now be described.

As described above, following step 314, a source device will have calculated respective values for the buffer occupancies $A_Y$ for responding devices, and will calculate for the current transmission (at time t) to the selected target device a value for the current forwarding success (CFS) of that transmission given by the equation $$CFS(t) = (1 - A_Y/A_X)^2$$

The CFS can be expressed in words as the square of the ratio of the available buffer space in the target device to the size of the payload in the source device, alternatively, the square of the ratio of the buffer vacancy $(1-A_Y)$ of the target device to the buffer occupancy $(A_X)$ of the source device.

The computation means 26 stores, on a rolling basis, the value of RFS calculated for the immediately preceding transmission (at time t−1) and calculates the value for RFS for the current transmission (time t) by the equation $$RFS(t) = 4/5\, RFS(t-1) + 1/5\, CFS(t)$$

This provides a higher weight for the CFS and biases the value for RFS towards the most recent ones. It will be understood that this RFS is an indicator of network congestion which is a balance between the current experience of buffer occupancies of the source and target devices, and a longer-term experience of the buffer occupancies. In other embodiments, different ratios of current to historic values are used, e.g. three quarters to one quarter, and five sixths to one sixth. The choice of ratio would be determined by the operational characteristics of the real vehicular network. In yet other (non-preferred) embodiments, the value for RFS is not weighted, but is simply the value of the CFS.

As mentioned, in this embodiment the minimum retransmit period is ten seconds. A typical value of RFS(t) under heavy network usage would be 0.4, and thus under these conditions the retransmit period would be twenty five seconds.

When a device has stored in its buffer a message for which an ACK is received, either directly from a WAP 90, or through exchange of acklists, the device will delete that acknowledged message from the buffer 24 (step 511, FIG. 5).

In the alternative embodiment in which the device marks the packet flow for dropping, the device retains such marked messages in its buffer until the next opportunity for forwarding transmission. In such a situation the device needs to manage separate buffer occupancies in respect of receiving messages and transmitting messages. When the device responds to receipt of an RTS, it will use a "receive" buffer occupancy which includes acknowledged (marked) messages temporarily remaining in the buffer and awaiting deletion at the next transmission event, but when the device is forwarding to a selected target device it will use a "transmit" buffer occupancy which ignores the marked messages in the buffer. The device will use the "transmit" buffer occupancy in the calculations for current forwarding success.

The present invention can also be incorporated in an opportunistic network of data relay devices as described in International Patent Application WO05/025147, the network operating in accordance with the steps:
 collecting data in buffer stores in one or more such devices;
 for each data relay device identifying a respective receiving device suitable for forwarding payload data to it;
 transmitting the payload data to the identified receiving device;
 exchanging data between the devices relating to their status within a hierarchy, the status data comprising data relating to the separation of the devices and the quantity of data in their buffer stores;
 each device defining, from the received status values, a scalar status value for the device indicative of its own position in the hierarchy, determined by the quantity of data stored in the buffer and its separation from other sensors;
 transmitting the status value so defined to other devices and receiving the corresponding status values of other devices; and
 identifying, from the status values received from other devices, a destination device having a status value which varies from the status value of the device in a manner indicative that payload data may be forwarded to it.

A device acting as a network access point in a network in accordance with International Patent Application WO05/025147 would assign itself a status value of zero.

The more capable that any other device is of receiving data (due to proximity to other such devices, or low buffer content), the lower the status value it will grant itself. Similarly, a full buffer will raise the status value of a device. By requiring that each device can only select other devices having lower status values, data can be quickly forwarded to the network access points (held at status value zero), while maintaining as even a load on the individual devices in the network as possible due to the nature of the determination of status value. In alternative embodiments, an opposite gradient hierarchy is used, wherein the network access point is assigned a status value of a maximum value, the devices of the network have lower values, and devices relay payload data to a device which is higher in the hierarchy than itself, instead of a device which is lower in the hierarchy.

The present invention is not limited to opportunistic networks employing an opportunistic routing algorithm based on calculating a respective forwarding direction as described above, or based on a respective hierarchical status value as described in International Patent Application WO05/025147, and can be used in any opportunistic network employing a routing algorithm in which the devices relay payload data through the network to a network access point which responds by acknowledging received payload data.

The invention claimed is:

1. A method of operating an opportunistic relaying network comprising at least one network access point, and a plurality of mobile wireless data relay devices each having a buffer for storing data messages, whether own-generated or received, such stored data messages being referred to hereafter as payload data, the method comprising:
 at a source one of said devices having payload data to be relayed to a network access point, the network access point being out of range of the source device,
 (a) transmitting a request to transmit (RTS), in respect of payload data;
 (b) receiving, from each said device within range of the source device and responding to the transmitted RTS, respective device-related status data comprising an indication of its buffer vacancy;
 (c) selecting in accordance with an opportunistic routing algorithm, a responding device to receive payload data;

(d) setting the period of a retransmission timer to be a minimum value multiplied by an inverse function of the buffer vacancy of the selected device;
(e) transmitting payload data to the selected device;
(f) triggering, upon that transmission, the retransmission timer; and
(g) upon expiry of the retransmission timer period, repeating steps (a) to (f) in respect of any transmitted payload data for which acknowledgment generated by a network access point has not been received.

2. A method of operating an opportunistic relaying network comprising at least one network access point, and a plurality of mobile wireless data relay devices each having a buffer for storing data messages, whether own-generated or received, such stored data messages being referred to hereafter as payload data, the method comprising:
at a source one of said devices having payload data to be relayed to a network access point, the network access point being out of range of the source device,
(a) transmitting a request to transmit (RTS) in respect of payload data;
(b) receiving, from each said device within range of the source device and responding to the transmitted RTS, respective status data comprising an indication of its buffer vacancy;
(c) selecting in accordance with an opportunistic routing algorithm, a responding device to receive payload data;
(d) setting the period of a retransmission timer to be a minimum value multiplied by an inverse function of the buffer vacancy of the selected device, wherein the inverse function includes the ratio of the buffer occupancy of the source device to the buffer vacancy of the selected device;
(e) transmitting payload data to the selected device;
(f) triggering, upon that transmission, a retransmission timer; and
(g) upon expiry of the retransmission timer period, repeating steps (a) to (f) in respect of any transmitted payload data for which acknowledgment generated by a network access point has not been received.

3. A method as claimed in claim 2, wherein the inverse function includes the square of that ratio.

4. A method as claimed in claim 3, wherein the inverse function is the summation of two terms, the first term being a fraction k of the square of that ratio, and the second term being a fraction j of the value of the inverse function for the immediately preceding transmission from that source device.

5. A method as claimed in claim 4, wherein the fraction j is equal to 1−k.

6. A method as claimed in claim 5, wherein the fraction k is one-fifth.

7. A method as claimed in claim 1, wherein the source device transmits the payload data in the form of messages together with associated message identifiers, and the or each network access point is arranged such that the generated acknowledgment includes the message identifiers of received payload data.

8. A method as claimed in claim 1, wherein the devices send received acknowledgments when responding to a received RTS.

9. A method as claimed in claim 1, wherein the devices send received acknowledgments in response to receipt of payload data.

10. A data relay device having:
a buffer for storing payload data for subsequent transmission;
a transmitter;
a receiver;
requesting means for sending to the transmitter a request to transmit (RTS) in respect of payload data;
a retransmission timer having a minimum timer period;
processing means, responsive to respective device-related status data received from other devices responding to a transmitted RTS, to select, in accordance with an opportunistic routing algorithm, a responding device, to send to the transmitter payload data for the selected device and to trigger the retransmission timer, and responsive to receipt of an RTS from another device to generate its device-related status data including an indication of its buffer vacancy and to send that generated device-related status data to the transmitter;
setting means responsive to an indication of buffer vacancy included in received device status data to set the period of the retransmission timer to be the minimum period multiplied by an inverse function of the buffer vacancy of the selected device; and
means responsive to the absence, at the expiry of the retransmission timer period, of acknowledgment in respect of transmitted payload data to cause the requesting means to send a further request to the transmitter, and to cause the processing means to repeat in respect of unacknowledged transmitted payload data, its functions of selecting, sending and triggering.

11. A data relay device having:
a buffer for storing payload data for subsequent transmission;
a transmitter;
a receiver;
requesting means for sending to the transmitter a request to transmit (RTS) in respect of payload data;
a retransmission timer having a minimum timer period;
processing means, responsive to status data received from other devices responding to a transmitted RTS, to select, in accordance with an opportunistic routing algorithm, a responding device, to send to the transmitter payload data for the selected device and to trigger the retransmission timer, and responsive to receipt of an RTS from another device to generate status data including an indication of its buffer vacancy and to send that generated status data to the transmitter;
setting means responsive to an indication of buffer vacancy included in received status data to set the period of the retransmission timer to be the minimum period multiplied by an inverse function of the buffer vacancy of the selected device, wherein the inverse function includes the ratio of the buffer occupancy of the source device to the buffer vacancy of the selected device; and
means responsive to the absence, at the expiry of the retransmission timer period, of acknowledgment in respect of transmitted payload data to cause the requesting means to send a further request to the transmitter, and to cause the processing means to repeat in respect of unacknowledged transmitted payload data, its functions of selecting, sending and triggering.

12. A device as claimed in claim 11, wherein the inverse function includes the square of that ratio.

13. A device as claimed in claim 12, wherein the inverse function includes a fraction k of the square of that ratio added to a fraction j of the inverse function for the immediately preceding transmission from that source device.

14. A device as claimed in claim 13, wherein the fraction j is equal to 1−k.

15. A device as claimed in claim 14, wherein the fraction k is one-fifth.

16. A device as claimed in claim 10, wherein the processing means is arranged to transmit the payload data in the form of messages together with associated message identifiers.

17. A device as claimed in claim 10, wherein the processing means is arranged to send received acknowledgments when responding to a received RTS.

18. A device as claimed in claim 10, wherein the processing means is arranged to send received acknowledgments in response to receipt of payload data.

19. A method as claimed in claim 2, wherein the source device transmits the payload data together with associated identifiers, and the or each network access point is arranged such that the generated acknowledgment includes the identifiers of received payload data.

20. A method as claimed in claim 2, wherein the devices send received acknowledgments when responding to a received RTS.

21. A method as claimed in claim 2, wherein the devices send received acknowledgments in response to receipt of payload data.

22. A device as claimed in claim 11, wherein the processing means is arranged to transmit the payload data together with associated identifiers.

23. A device as claimed in claim 11, wherein the processing means is arranged to send received acknowledgments when responding to a received RTS.

24. A device as claimed in claim 11, wherein the processing means is arranged to send received acknowledgments in response to receipt of payload data.

* * * * *